US010563981B1

(12) United States Patent
Li et al.

(10) Patent No.: US 10,563,981 B1
(45) Date of Patent: Feb. 18, 2020

(54) AUTOMATED MOTION DATA PROCESSING

(71) Applicant: Moov Inc, Mountain View, CA (US)

(72) Inventors: Meng Li, Mountain View, CA (US);
Yaohua Hu, Mountain View, CA (US);
Tong Yuan, Beijing (CN)

(73) Assignee: Moov Inc., San Mateo, CA (US)

( * ) Notice: Subject to any disclaimer, the term of this patent is extended or adjusted under 35 U.S.C. 154(b) by 1403 days.

(21) Appl. No.: 14/464,250

(22) Filed: Aug. 20, 2014

Related U.S. Application Data

(60) Provisional application No. 61/940,492, filed on Feb. 17, 2014, provisional application No. 61/868,865, filed on Aug. 22, 2013.

(51) Int. Cl.
G01C 19/00 (2013.01)
G01P 15/00 (2006.01)

(52) U.S. Cl.
CPC .............. G01C 19/00 (2013.01); G01P 15/00 (2013.01)

(58) Field of Classification Search
CPC . G01P 21/00; G01P 7/00; G01P 15/00; G01C 21/16; G01C 21/165; G01C 22/006; G01C 19/00; G01D 18/00; B62D 57/032; A43B 1/0054; A63B 71/0619; G08B 21/18
USPC ............. 342/42; 73/1.38; 700/245; 701/104, 701/141, 96; 33/700; 601/69; 702/160
See application file for complete search history.

(56) References Cited

U.S. PATENT DOCUMENTS

| 7,653,508 | B1* | 1/2010 | Kahn | G01C 22/006 33/700 |
| 8,150,550 | B2* | 4/2012 | Suga | B62D 57/032 700/245 |
| 2009/0319221 | A1* | 12/2009 | Kahn | A61B 5/1123 702/141 |
| 2009/0326851 | A1* | 12/2009 | Tanenhaus | G01C 21/16 702/96 |
| 2011/0071785 | A1* | 3/2011 | Heath | G01C 21/165 702/96 |
| 2011/0304497 | A1* | 12/2011 | Molyneux | A43B 1/0054 342/42 |
| 2013/0204411 | A1* | 8/2013 | Clark | A63B 71/0619 700/91 |
| 2013/0311134 | A1* | 11/2013 | Kordari | G06F 17/10 702/160 |
| 2014/0024981 | A1* | 1/2014 | Chun | A61H 1/00 601/69 |
| 2014/0149062 | A1* | 5/2014 | Chandrasekaran | G01D 18/00 702/104 |
| 2014/0150521 | A1* | 6/2014 | Jacobson | G01P 21/00 73/1.38 |

(Continued)

Primary Examiner — Regis J Betsch
Assistant Examiner — Kaleria Knox
(74) Attorney, Agent, or Firm — Van Pelt, Yi & James LLP

(57) ABSTRACT

Motion data processing includes receiving a plurality of motion data samples, wherein the plurality of motion data samples comprises a plurality of acceleration data samples obtained by an accelerometer and a plurality of angular velocity data samples obtained by a gyroscope, and the plurality of motion data samples pertains to a plurality of motions performed by a user; and correcting for distortions in the motion data samples, including determining, based at least in part on some of the motion data samples, a set of one or more corrected core measurements of the user's body positions during a subset of the plurality of motions.

20 Claims, 12 Drawing Sheets

(56) References Cited

U.S. PATENT DOCUMENTS

| | | | | |
|---|---|---|---|---|
| 2014/0197946 A1* | 7/2014 | Park | ...................... | G08B 21/18 |
| | | | | 340/539.11 |
| 2015/0285835 A1* | 10/2015 | Karahan | ................. | G01P 21/00 |
| | | | | 73/1.38 |
| 2015/0360080 A1* | 12/2015 | Hadaschik | ................ | G01P 7/00 |
| | | | | 73/865.4 |

* cited by examiner

AUTOMATED MOTION DATA PROCESSING

CROSS REFERENCE TO OTHER APPLICATIONS

This application claims priority to U.S. Provisional Patent Application No. 61/868,865 entitled HARDWARE DEVICES AND THE ASSOCIATED SOFTWARE APPLICATIONS TO SENSE, CAPTURE, ANALYZE, TRACK AND CONNECT REAL-TIME WORKOUT DATA AND CONTEXTS TO HELP PEOPLE ACHIEVE WORKOUT GOALS filed Aug. 22, 2013 which is incorporated herein by reference for all purposes.

This application claims priority to U.S. Provisional Patent Application No. 61/940,492 entitled USER INTERACTIONS, ALGORITHMS AND INDUSTRIAL DESIGN TO ADOPT WEARABLE MOTION SENSING DEVICES IN FITNESS EXERCISES AND SPORTS filed Feb. 17, 2014 which is incorporated herein by reference for all purposes.

BACKGROUND OF THE INVENTION

Conventional ways of exercising to achieve fitness goals can be challenging for many people. Exercising typically involves performing repetitive motions, which many view as tedious and therefore not enjoyable. Moreover, it is difficult for individuals to track the performance of their exercises besides using basic measurements such as time and distance. Today, one often needs to hire a personal trainer to get deeper knowledge and advice about one's workouts. In addition to the high cost, the expertise of the personal trainers can vary and the quality of their advice cannot be guaranteed.

There are some wearable devices that provide functions such as automatic step counting or distance tracking. These devices, however, typically only provide limited information about basic exercises such as how much a person has walked in a day, which can be insufficient for those who want to improve the quality of their workouts in addition to quantity.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An automated fitness coaching system is disclosed. When a user of the automated fitness coaching system performs a specific exercise, he typically performs a series of repetitive motions. The automated fitness coaching system determines one or more corrected core measurements associated with a subset of the motions based on acceleration data samples, velocity data samples, and optionally magnetic field data samples that are measured by sensors. In some embodiments, one or more form measurements are further determined based on the core measurements. In some embodiments, feedbacks based on evaluation results are provided to the user.

Figure 1:
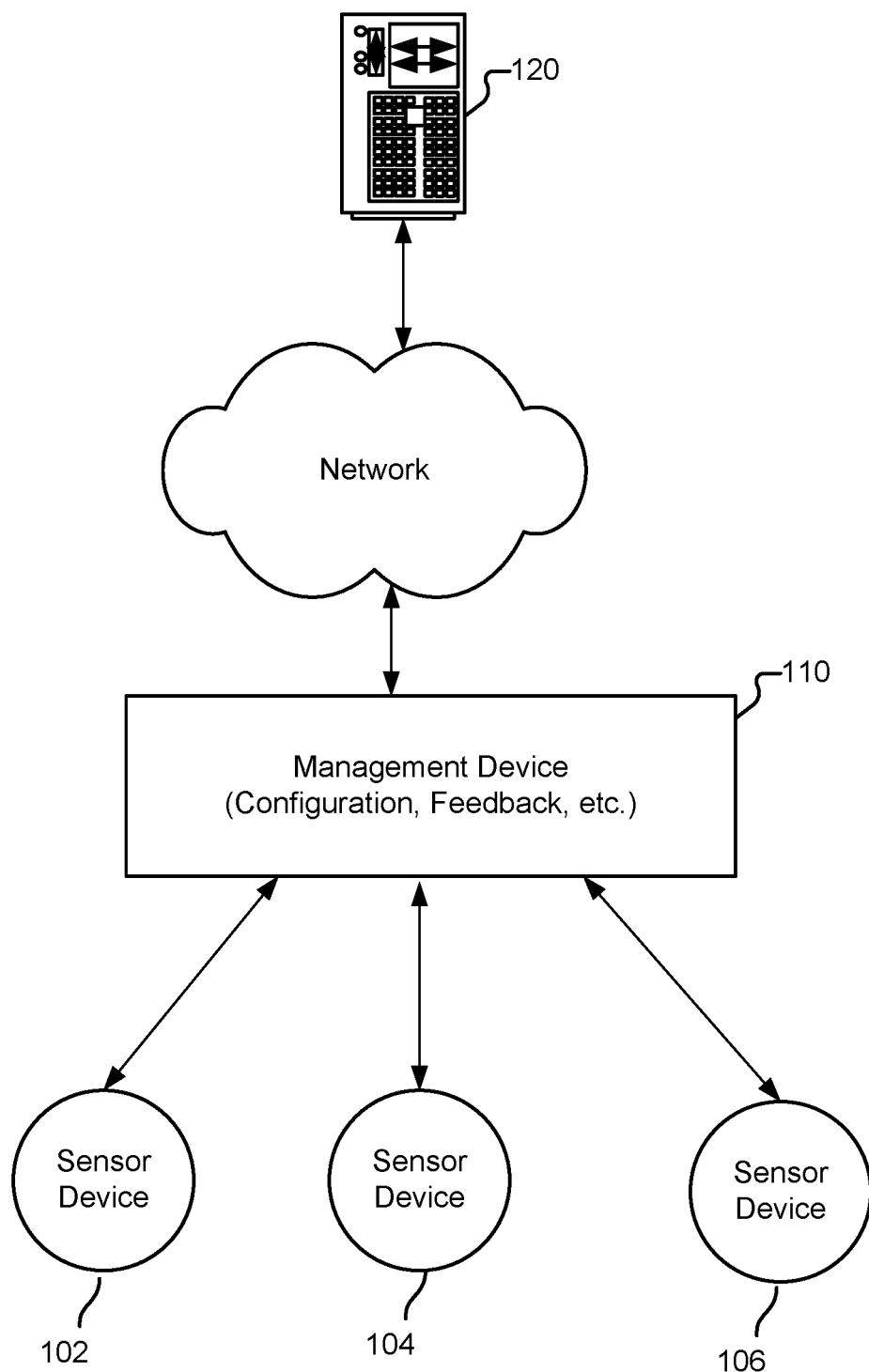
FIG. 1 is a system diagram illustrating an embodiment of an automated fitness coaching system.

FIG. 1 is a system diagram illustrating an embodiment of an automated fitness coaching system. In this example, one or more sensor devices 102-106 are used to detect motions performed by a user. A user wears one or more sensor device(s) during exercise (e.g., on the ankle while running, on arms and legs while swimming, etc.) to capture motion data. As will be described in greater detail below, a sensor device includes one or more accelerometers and one or more gyroscopes, and optionally, one or more magnetometers are configured to take measurement data samples of acceleration, angular velocity, and optionally magnetic field, respectively, in connection with the user motions. In some embodiments, the accelerometer(s), the gyroscope(s), and the magnetometer(s) are implemented using one or more integrated circuits (ICs).

The data samples are processed to evaluate the user's performance and optionally provide feedback. In some embodiments, a sensor device includes an onboard processor configured to perform the data processing and evaluation, as well as an output mechanism to provide feedback (e.g., a speaker to provide audio feedback, a video screen or a light to provide visual feedback, a haptic display to provide tactile feedback, etc.) such as information about the user's form, the difference between the user's form and the target, what the user can do to improve his form, etc. In some embodiments such as the example shown, the sensor devices are connected (e.g., via a wireless communication interface such as Bluetooth interface) to a management device 110, which can be a personal computer, a smartphone, a tablet, or any other appropriate computing device that is configured to perform the data processing, evaluation, and/or feedback. The feedback information can be provided to the user on the management device, provided to the sensor device to be played, or otherwise conveyed to the user. The management device also executes configuration and any other related management application to manage the configuration and operations of the sensor devices.

In some embodiments, the management device (or the sensor device if the sensor device directly performs processing) is optionally connected to a server 120 via a network such as the Internet. Data such as configuration, measurements, performance, etc. can be stored on the server to be accessed later and/or further processed.

Figure 2A:
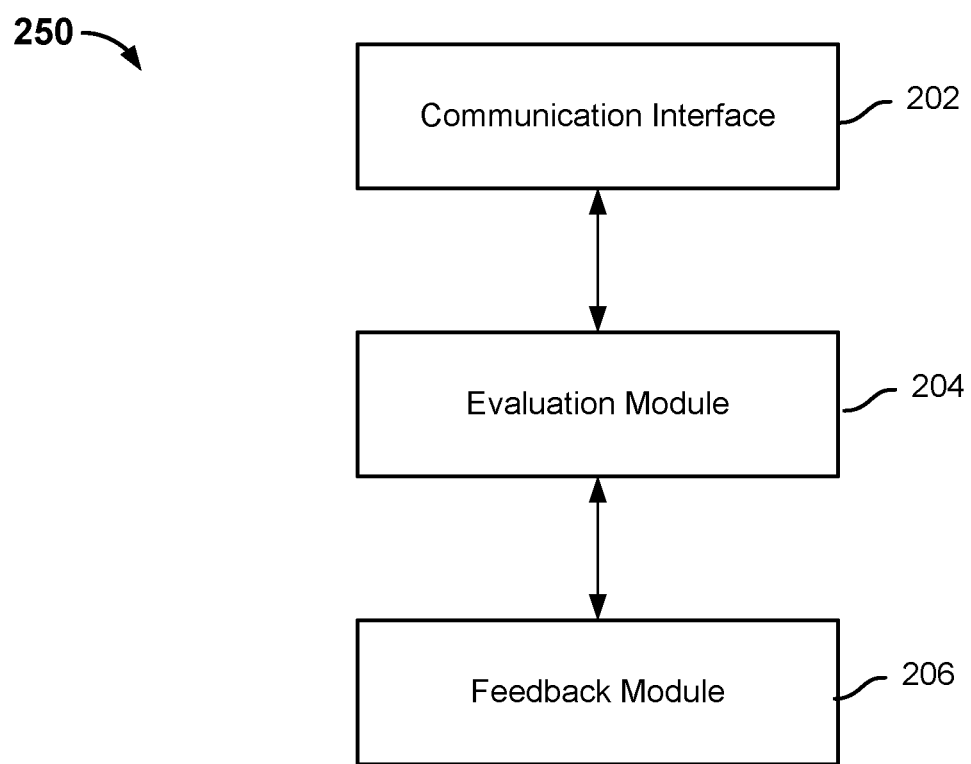
FIG. 2A is a functional diagram illustrating an embodiment of an automated fitness coaching system.

FIG. 2A is a functional diagram illustrating an embodiment of an automated fitness coaching system. System 200 includes a communication interface 202 configured to receive motion data samples pertaining to motions performed by a user of the system. Examples of a communication interface include without limitation external connections, such as a port, cable, wireline or wireless network interface card, etc., and internal connections such as a communication bus.

System 200 further includes an evaluation module 204 coupled to the communication interface. The data samples received from the sensors tend to be inaccurate. Thus, the evaluation module is configured to determine, based at least in part on the motion data samples, one or more corrected core measurements such as velocity and orientation associated with a subset of the user's motions. In some embodiments, the evaluation module also derives, based on the corrected core measurements, form measurements of the user's body positions for a subset of the user's motions. The evaluation module can be implemented as software components executing on one or more processors, as hardware such as programmable logic devices and/or Application Specific Integrated Circuits designed to perform certain functions, or a combination thereof. In some embodiments, the module can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application.

System 200 further includes a feedback module 206 coupled to the evaluation module. Based on the evaluation results, the feedback module provides feedback to the user via audio, visual, and any other appropriate form of output. In various embodiments, the feedback module includes a microphone, a display screen, an LED, a haptic output that provides tactile feedback, and/or any other appropriate output device.

The modules may be implemented on a single device or distributed across multiple devices. The functions of the modules may be included in another module or further split into multiple sub-modules. In some embodiments, the communication interface, the evaluation module, and the feedback module are all implemented on a management device, where the motion data samples are sent by a sensor device to the management device, received by its communication interface, evaluated by the evaluation module, and feedback information is presented by the feedback module. In some embodiments, the communication interface, the evaluation module, and the feedback module are all implemented on a sensor device, where the motion data samples are captured by sensors on the sensor device, sent via the communication interface to the evaluation module on the sensor device to be evaluated, and feedback information is provided by the feedback module on the sensor device. In some embodiments, the communication interface and the modules (or subcomponents of the modules) are implemented on separate devices. For example, the evaluation of form information can be performed on the sensor device, and the processed information is sent to the management device for feedback and display.

Figure 2B:
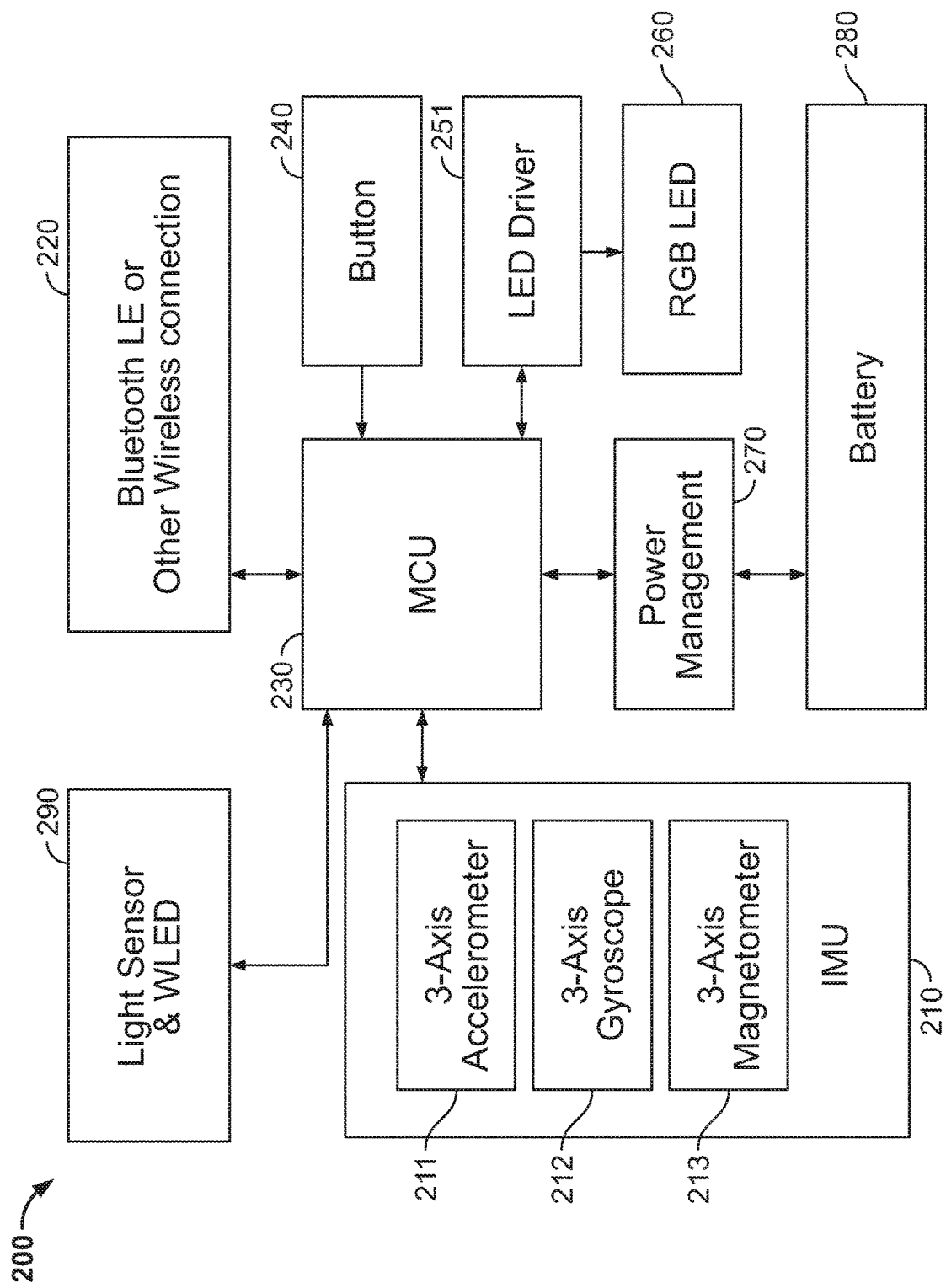
FIG. 2B is a block diagram illustrating an embodiment of a sensor device.

FIG. 2B is a block diagram illustrating an embodiment of a sensor device. In this example, sensor device 200 is worn by a user (e.g., on his ankle or on his arm) while he exercises. Sensor device 200 includes an inertial magnetic unit (IMU) which includes a 3-axis accelerometer 211, a 3-axis gyroscope 212, and an optional 3-axis magnetometer 213 that are configured to take sample measurements of the user's motion during the exercise. A single repetition of a motion (e.g., a single step during a running exercise, a single punch during a boxing exercise, a single stroke during a swimming exercise) may comprise N acceleration samples measured by the accelerometer, N angular velocity samples measured by the gyroscope, and N magnetic field samples measured by the magnetometer (where N is an integer value). In some embodiments, the IMU is implemented using a chipset provided by an electronics manufacturer such as InvenSense.

In this example, sensor device 200 optionally includes a microcontroller unit 230, with which IMU 210 is connected. In this example, sample measurement data collected by the IMU is offloaded to a management device to be further processed. MCU 230 sends and receives data gathered by the IMU through a communication interface 220, which can be a Bluetooth LE or any other appropriate wireless connection, with a management device 110 such as a smart phone, tablet or PC. In some embodiments, other sensor device designs can be employed. For example, the sensor device can include an onboard processor coupled to the IMU and configured to process the sample measurement data and evaluate the corrected core measurements and/or form measurements locally.

Sensor device 200 optionally includes an RGB LED 260 driven by LED driver 251. The light color and strength of each LED in the RGB LED are controlled by the sensor device itself or the management device, and the color and strength values are set according to the LED manufacturer's specifications. In some embodiments, the LED provides feedback information. For example, when the user is exercising with good form that meets a target, the LED emits green light; when the user is not meeting the target, the LED emits red light. The sensor device also optionally includes a button 240. In various embodiments, the button is multi-functional and can be used as power on a switch/sleep mode activator or a general purpose user interface button. The sensor device also optionally includes a light sensor and white LED 290, which is configured to detect different types of mounting chassis on which the device is mounted. The sensor device 200 also includes a battery 280. The voltage delivered to the other parts of the sensor device is delivered through power management module 270.

Figure 3:
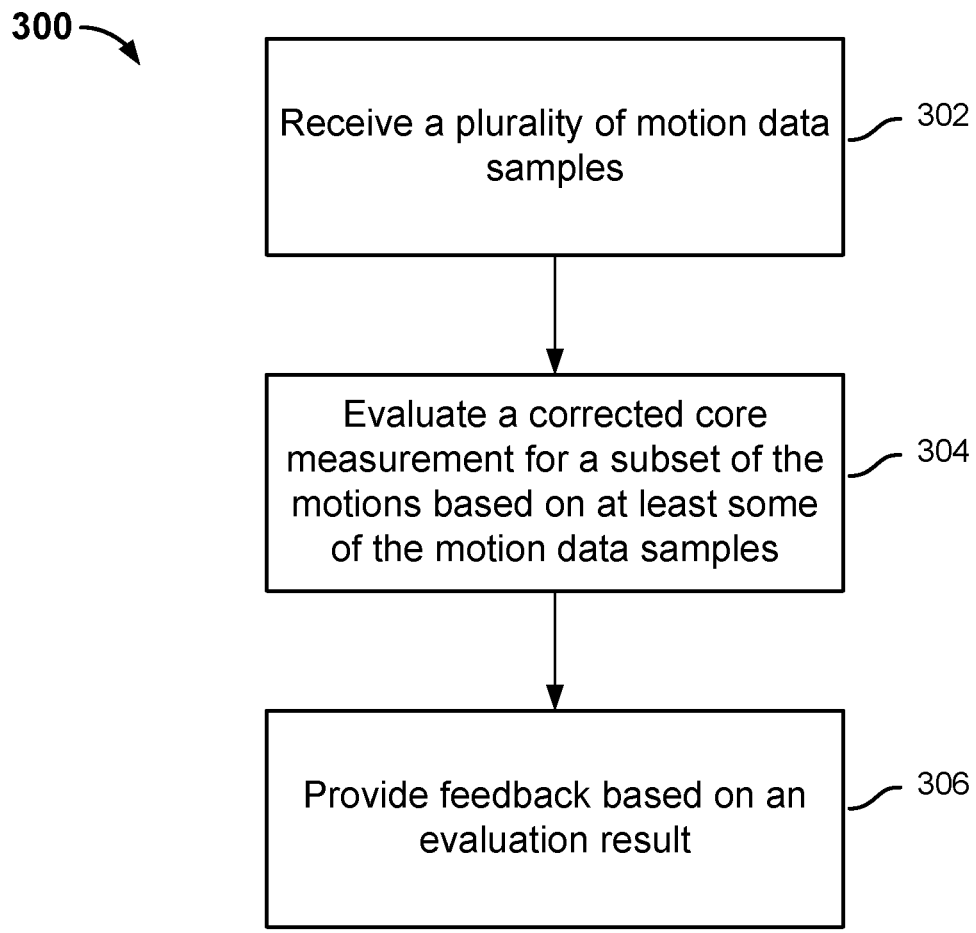
FIG. 3 is a flowchart illustrating an embodiment of a process performed by the automated fitness coaching system.

FIG. 3 is a flowchart illustrating an embodiment of a process performed by the automated fitness coaching system. Depending on implementation, process 300 can be performed on the sensor device and/or on the management device.

At 302, a plurality of motion data samples is received. The motion data samples pertain to a set of motions performed by a user. The motion data samples include a set of acceleration data samples taken by the accelerometer, a set of angular velocity data samples taken by the gyroscope, and optionally a set of magnetic field data samples taken by the magnetometer. In other words, the samples are taken while a user wearing one or more sensor devices is performing a set of exercise motions. For example, while running, the user wears a sensor device on his leg to capture motion data of the leg's movements; while swimming, the user wears a sensor on his arm to capture motion data of the strokes made by the arm, and a sensor on his leg to capture motion data of the kicks made by the leg. Additional sensor devices can be worn so that motion data of both sides of the body is captured.

In some embodiments, the sensor device includes a processor that performs the data processing, and the data is received via an internal communication interface (e.g., a bus). In some embodiments, the management device includes a processor that performs the data processing, and the data is received at the management device via an external communication interface (e.g., a Bluetooth LE or other types of wireless connection).

At 304, one or more corrected core measurements associated with the user's form for a subset of the motions is evaluated based at least in part on some of the motion data samples. Specifically, the corrected core measurements measure the user's body positions while he performs the subset of motions. In some embodiments, the corrected core measurements include a velocity (expressed as a vector V) and an orientation (also referred to as a quaternion, and expressed as a vector Q). Other corrected core measurements can be determined. Details of the evaluation are described below.

Since exercise motions are often repetitive, in some cases each corrected core measurement measures the body positions of the user during a single repetition of the exercise motions (e.g., a single step during running, a single stroke during swimming, a single punch during boxing, etc.). Optionally, one or more form measurements measuring the user's form during the single repetition are derived based on the core measurement data. Examples of form measurements include cadence, stride, range of motion, efficiency, speed, landing impact, pronation, etc. The form measurements can be instantaneous measurements of a single motion rather than averages of a series of motions. For example, the user's instantaneous stride is determined by measuring how much time it takes for him to run a single step, and the cadence is the reciprocal of the stride; the user's instantaneous range of motion is determined by measuring the maximum angular motion of his leg between the most forward and most backward positions; the user's instantaneous efficiency is determined based on the energy concentration of the angular velocity; the user's instantaneous speed is determined based on velocity; the user's landing impact is determined based on acceleration; the user's pronation is determined based on the orientation, and so on. As discussed above, the evaluation can be performed by the sensor device or by the management device. In some embodiments, multiple form measurements are used to further derive other form information, such as the average, mean, maximum, minimum, standard deviation, etc. In some embodiments, the corrected core measurements are used directly as form measurements. For example, during a boxing exercise, the velocity and orientation measurements are used to measure the user's form in delivering a punch. Details of how to evaluate a measurement using at least some of the set of motion data samples are discussed below.

At 306, feedback is provided based on an evaluation result.

In some embodiments, the corrected core measurements obtained by the evaluation module are directly compared with certain targets. For example, the velocity and rotation of a punch motion performed by the user are compared with those of a pre-recorded punch motion performed by a coach. In some embodiments, the derived form measurements are compared with a target. For example, the cadence, range of motion, etc., can be compared with pre-specified target goals. In some embodiments, the targets are specified by the user manually or by the system automatically. In some embodiments, the targets are specified for a particular set of exercises and/or as a part of a coached workout program. Feedback is provided to the user based at least in part on the comparison. For example, the user may be told and/or shown how much he is off target, and be given tips on how to adjust the movements to achieve target.

In some embodiments, a trained feedback model is used to intelligently provide feedback based on the evaluation result. Details of the feedback model are described below.

The following is an example technique of evaluating a set of corrected core measurements of the user's body positions during a subset of motions using the motion data samples obtained from sensors.

In this example, each input to the evaluation module includes a set of sensor output sample data in an object space, including: an accelerometer output that measures acceleration and is represented as Ax, Ay, Az (or a vector A for short), the units of the acceleration vector being in m/s$^2$ or in gravity units; a gyroscope output that measures the angular velocity and is represented as Gx, Gy, Gz (or a vector G for short), the units of the angular velocity vector being in rad/s or degree/s; and an optional magnetometer output that measures the magnetic field and is represented as Mx, My, Mz (or a vector M for short), the units of the magnetic field vector being in Gauss or Tesla.

The reference space of the measurements is a world space coordinate system. Specifically, the world space coordinate system is represented as Xw, Yw, Zw, where the Zw axis (0, 0, 1) corresponds to gravity direction; the Xw axis (1, 0, 0) corresponds to North direction (i.e., the magnetic north on a horizontal plane); and the Yw axis (0, 1, 0) is the cross product of Zw and Xw.

As will be described in greater detail below, an evaluation module such as 400 of FIG. 4 performs a process such as process 500 of FIG. 5A to obtain one or more of the following outputs: a velocity in world space, represented as Vx, Vy, Vz (or a vector V for short); an acceleration in world space, represented as (Ax, Ay, Az)w (or a vector Aw for short); a rotational velocity in world space and local space, represented as (Rx, Ry, Rz)w and (Rx, Ry, Rz)o, respectively (or vectors Rw, Ro for short); a quaternion (the quotient of two vectors) describing how to transform from a point in the local space to world space (e.g., the orientation and rotation) and another quaternion representing the world space to local space transformation, represented as (Qx Qy Qz Qw)o→w (or vector Q for short) and (Qx Qy Qz Qw)w→o (or vector Qw for short), respectively; or the relative position in world space, represented as (Px, Py, Pz) (or vector P for short).

In some embodiments, the corrected core measurements include the velocity vector V and the quaternion vector Q, and are processed further (e.g., by higher level software applications) to give the user feedback, coaching tips, etc. Given V and Q, other outputs can be computed. For example the relative position can be computed as $P(n)=V(n)$ *time_step; Qw is the inverse of Q; Rw=Ro*Q.

Although there are standard ways of computing the outputs based on the sensor sample data, in practice, however, the original sensor readings A, G, and M are highly noisy. Factors contributing to the noise include biased reading, nonlinearities and mismatching of components, etc. Using the standard ways to calculate the output will lead to significant errors in the result. An error correcting estimation technique is disclosed in connection with FIGS. 4 and 5.

Figure 4:
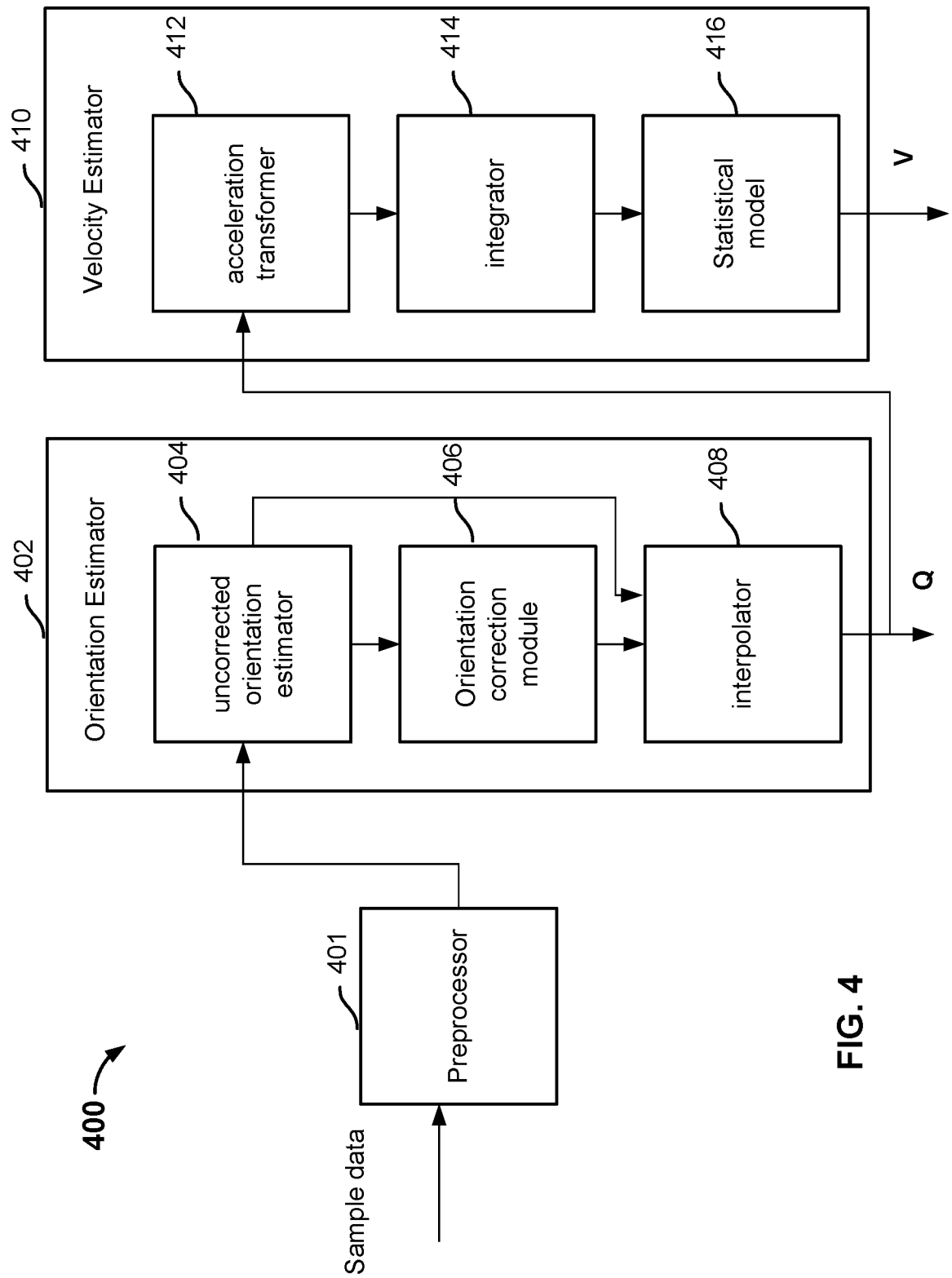
FIG. 4 is a block diagram illustrating an embodiment of an evaluation module.

FIG. 4 is a block diagram illustrating an embodiment of an evaluation module. As shown, evaluation module 400 includes a preprocessor 401 that transcodes data received on the interface to normalized space, aligns the axis, and performs initial calibrations on the accelerometer, gyroscope, and magnetometer measurements. Conventional techniques for transcoding, alignment, and calibration can be used. In some embodiments, the preprocessor further performs interpolation on received samples to estimate any sample data that may have been lost or corrupted during transmission.

The preprocessed data samples are sent to an orientation estimator 402 to estimate an interpolated and corrected current orientation, Q(n). In this example, the orientation estimation module includes an uncorrected orientation estimator 404 that determines an uncorrected current orientation of the current sample, Q'(n). An orientation correction module 406 makes a correction of Q'(n) based on the calibrated accelerometer output and optionally the magnetometer output, and generates a corrected current orientation Q"(n). An interpolator 408 interpolates the current sample Q'(n) and the corrected current orientation Q"(n) to generate an interpolated current orientation Q(n).

The output of the orientation estimator is sent to a velocity estimator 410 to estimate a current velocity. In this example, velocity estimator 410 includes an acceleration transformer 412 that transforms the acceleration reading in world space based on the estimated orientation, and removes the gravity vector to determine an absolute acceleration in world space. Velocity estimator 410 further includes an integrator 414 that determines an uncorrected velocity based on integrating velocity samples and acceleration. A statistical model 416 is applied to the output of the integrator to generate an error-corrected velocity estimation.

Figure 5A:
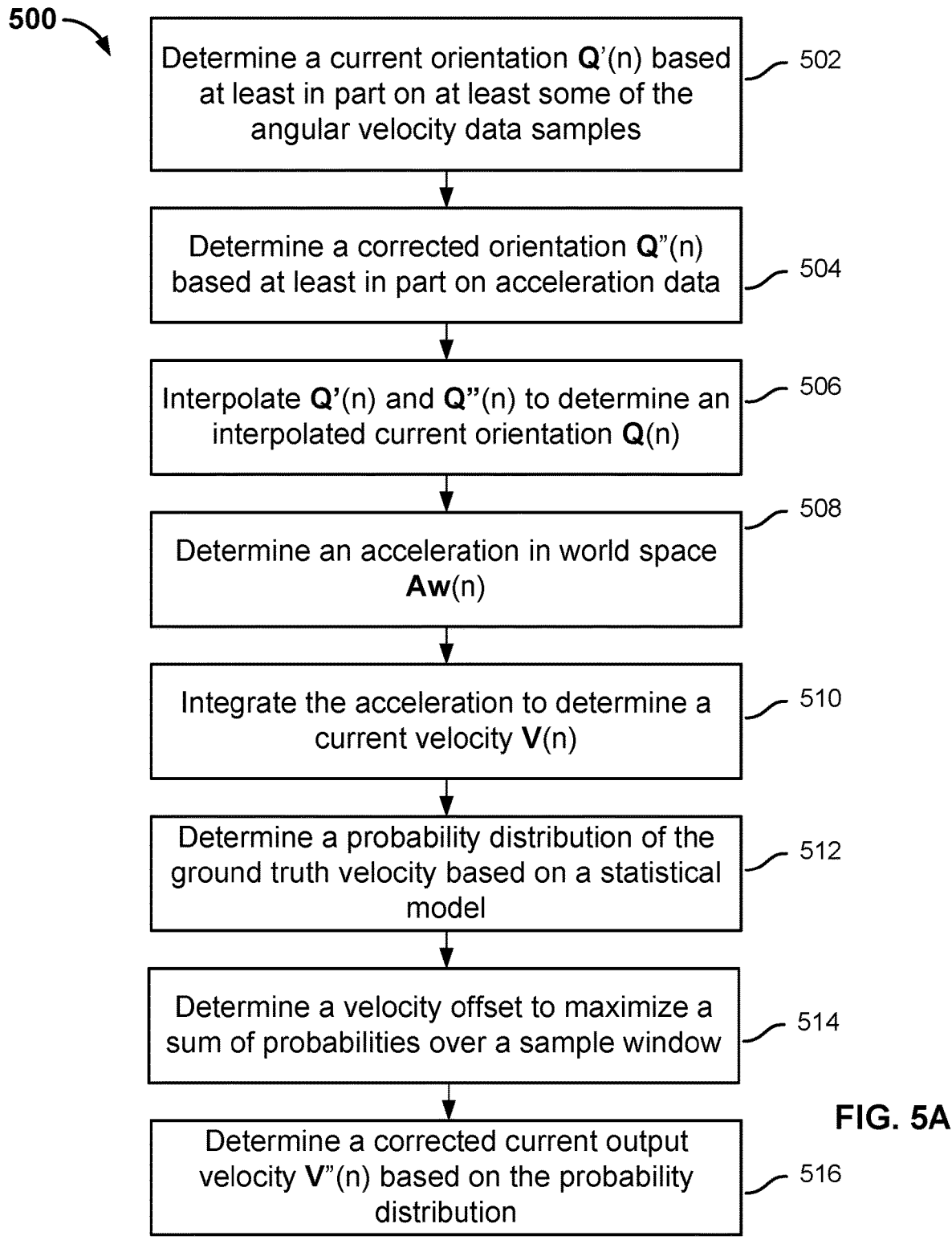
FIG. 5A is a flowchart illustrating an embodiment of an improved process for transforming the sensors' outputs and determining form measurements.

FIG. 5A is a flowchart illustrating an embodiment of an improved process for transforming the sensors' outputs and determining form measurements. Process 500 corrects for errors in the raw sensor outputs to generate more accurate form information. Process 500 can be performed on the sensor device itself and/or on the management device, and is used to implement 304 of FIG. 3 in some embodiments.

In some embodiments, the sensors are calibrated and initialized by a preprocessor. For example, the sensors can have offsets due to imperfections in their hardware. An initial calibration process adjusts for such offsets and errors. In some embodiments, the initial calibration process is performed by the manufacturer of the sensor device. A set of calibration functions with certain calibration parameters is applied to the raw sensor outputs A, G, and M to obtain calibrated and initialized outputs Ai, Gi, and Mi as follows:

$$Ai=\text{calibration}_{Ai}(A,\text{calibration\_parameters}) \quad (1)$$

$$Gi=\text{calibration}_{Gi}(G,\text{calibration\_parameters}) \quad (2)$$

$$Mi=\text{calibration}_{Mi}(M,\text{calibration\_parameters}) \quad (3)$$

The actual calibration functions and calibration parameters are determined empirically and may vary in different implementations. For example, the calibration function can subtract certain offsets from a raw output, multiply the raw output by a constant, etc.

Corrected orientation data is determined based at least in part on the angular velocity data, the acceleration data, and the magnetic field data if available. Preferably, preprocessed data based on the raw measurements is used. At 502, the current orientation (of the current sample n) is determined based at least in part on the angular velocity data samples (gyroscope reading Gi), which has a linear relationship to local space rotational velocity Ro. In this example, Gi is the same as Ro, although other linear relationships may exist between the two in other embodiments. Specifically, the current orientation data sample (expressed as the quaternion Q'(n), n being the sample index or time index) is updated by performing a quaternion transform operation on the previous interpolated orientation data sample Q(n−1) and the current local space rotational velocity Ro(n) as follows:

$$Q'(n)=\text{transform}_Q(Q(n-1),Ro(n),\text{time\_step}) \quad (4)$$

where $\text{transform}_Q$ is a standard quaternion transform function.

If left uncorrected, the output Q'(n) will drift over time. Thus, at 504, a corrected orientation Q"(n) is determined based at least in part on the acceleration data. Particular, the preprocessed acceleration data Ai and the preprocessed magnetic field data Mi are used in the determination. Specifically, Ai and Mi form a local coordinate system relative to the world coordinate system. The local coordinate system is a coordinate system that is relative to the device itself. The rotational transform of the world space to the local coordinate system is expressed as Q"(n) and derived as follows:

First, a 3×3 rotational matrix Mr is constructed from Ai and Mi, where $$vec3Y=\text{normalize}(Vec3::\text{Cross}(Mi,Ai)); \quad (5a)$$

$$vec3X=\text{normalize}(Mi); \quad (5b)$$

$$vec3Z=\text{normalize}(Ai); \quad (5c)$$

$$Mr.\text{column1}.x=X.x; \quad (5d)$$

$$Mr.\text{column1}.y=Y.x; \quad (5e)$$

$$Mr.\text{column1}.z=Z.x; \quad (5f)$$

$$Mr.\text{column2}.x=X.y; \quad (5g)$$

$$Mr.\text{column2}.y=Y.y; \quad (5h)$$

$$Mr.\text{column2}.z=Z.y; \quad (5i)$$

$$Mr.\text{column3}.x = X.z; \quad (5j)$$

$$Mr.\text{column3}.y = Y.z; \quad (5k)$$

$$Mr.\text{column3}.z = Z.z; \quad (5l)$$

Then, rotational matrix Mr is then converted to a quaternion Q"(n) using a standard mathematical transform.

At 506, an interpolated and corrected current orientation Q(n) is determined by interpolating Q'(n) and Q"(n). Any known interpolation function can be used. In some embodiments, a weighted linear interpolation function is used as follows:

$$Q(n) = \text{interpolate}(Q'(n), Q''(n), \text{alpha}) \quad (6)$$

Typically, 0<alpha<1. The weight alpha is based on the stableness of the raw sensor reading. The more stable the reading is, the greater weight is assigned to Q"(n). In some embodiments, the stability of the sensor reading is determined based on a probability distribution (discussed in greater detail below in connection with step 512). A more concentrated probability distribution indicates greater stability and corresponds to a greater weight.

The corrected velocity is determined based at least in part on Q(n) and a statistical model. At 508, an acceleration in world space, Aw(n), is determined. Since the accelerometer reading includes the earth's gravity, the transform function transforms the acceleration reading in world space Ai(n) based on the estimated orientation, and then removes gravity from the transformed value to determine the acceleration in world space as follows:

$$Aw(n) = \text{transform}_v(Ai(n), Q(n)) - \text{gravity} \quad (6)$$

where $\text{transform}_v$ is a standard vector transform that transforms Ai to a new direction according to Q.

At 510, the acceleration is integrated to determine a current velocity V(n) as follows:

$$V(n) = V(n-1) + Aw(n) * \text{time\_step} \quad (7)$$

If left uncorrected, velocity V(n) will drift over time. Thus, a statistical model is used to remove the accelerometer's bias or zero offset, and minimize errors in velocity estimation.

In some embodiments, the statistical model is a distribution model of sensor output features to ground truth human motion velocity. The motion data of various human users wearing various sensors and performing exercises is captured using a system that is independent of the sensors and that is known to produce accurate measurements. For example, a camera-based system is used in some embodiments to capture sample position data of the users' leg movements. Multiple position data can be captured for a single action such as a single step. To build the model, sample data of many steps taken by many different users wearing different sensors is captured. The sample position data may be further processed to accurately derive other data such as velocity associated with these motions. In particular, the velocity that is determined using the independent system is referred to as "ground truth velocity." Meanwhile, the sensors also capture data, and a set of sensor output features derived based on the sensors' outputs is determined. Examples of the sensor output features include the statistical variance, frequency, and magnitude of the captured sensor data. The features characterize the motions being performed. For example, a slow motion tends to correspond to a low variance in the sensor output data, and a fast motion tends to correspond to a high variance in the sensor output data.

At 512, a probability distribution of the ground truth velocity for a specific sensor output feature is determined based on a statistical model for the given sensor output feature. Examples of a sensor output feature include frequency, variance, standard deviation, and any other appropriate characteristics derived from the acceleration data, the angular velocity data, and/or magnetic field data. In some embodiments, the sensor output feature is a vector in multiple dimensions where each dimension corresponds to a particular feature of a particular type of sensor output (e.g., the frequency for acceleration data). The probability distribution function is expressed as P (Vg, sensor_feature).

Figure 5B:
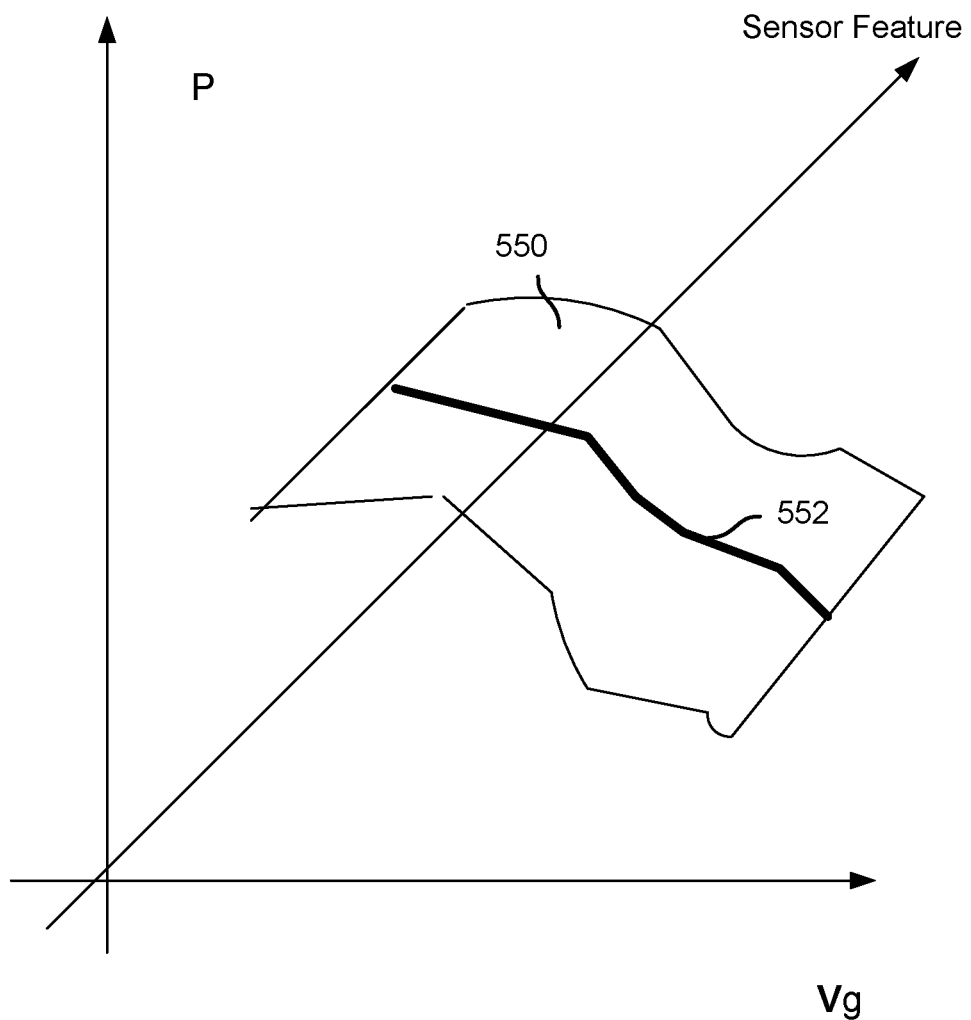
FIG. 5B is a diagram illustrating an example statistical model of ground truth velocities relative to a specific sensor output feature in a single dimension.

FIG. 5B is a diagram illustrating an example statistical model of ground truth velocities relative to a specific sensor output feature in a single dimension. In this example, the sensor output feature corresponds to the frequency of one set of sensor measurement data (e.g., as determined by performing an operation such as a Fourier transform on the sensor measurement). Other sensor output features such as variance, standard deviation, etc., can be used and correspond to different statistical distribution functions. Specifically, the statistical model in this example is represented as a 3-D surface 550 that corresponds to function P (Vg, sensor_feature). Given this distribution function, for a given frequency, there is a corresponding probability distribution of ground truth velocities (e.g., function curve 552). Accordingly, for each sample point, there is a corresponding sensor output feature value, and a corresponding distribution of possible human velocity, expressed as $P_x'$ (Vg), where x is the sample index. Further, given the probability distribution P, there is a corresponding preset alpha that is set based on how stable the distribution is, which is used in the interpolation function (6).

Returning to FIG. 5, at 514, an offset of the velocity is determined such that the sum of probabilities for n over a sample window of (n0, n1) is maximized, as follows:

$$\text{Maximize}\left(\sum_{n=n0}^{n1} P_n'(V(n) - Voff(n))\right) \quad (8)$$

where Voff(n)=a*n+b, where n is the sample index or time. An optimization algorithm such as a search-based optimization or any other appropriate optimization algorithm is used to solve for a and b to maximize the sum of the corrected probability values over the window n0 and n1. The window size is preferably set to the average time for a typical user to perform a motion (e.g., if it takes on average 0.5 seconds to perform a motion and the sample rate is 100 samples/second, then the window size is preferably set to 0.5*100=50 samples.)

At 516, the corrected current output velocity V"(n) is capped based on the current output feature's distribution at the current sample point and the offset as follows:

$$V''(n) = \text{Normalize}(V'(n)) * \text{Min}(\text{magnitude}(V'(n)), V\text{max\_magnitude}(n)) \quad (9)$$

where V'(n)=V(n)−Voff, Vmax_magnitude(n) is the maximum velocity the motion can reach based on the current sensor output features with a certain degree of confidence or probability. For example, it is 99% likely that the user cannot reach more than two meters per second with this motion pattern.

Although the example process above includes a magnetometer measurement, the magnetometer measurement is optional. A coordinate system can still be built without the magnetometer measurement, even though information about the North direction is lost and the horizontal direction cannot be determined. In practice, the coaching system can still give the user feedback on his form by arbitrarily selecting a north direction.

The automated fitness coaching system is often implemented in a lossy environment where some samples transmitted from the sensor device to the management device can be lost. An index-based transmission technique is implemented in some embodiments to make corrections in the event of data loss. In some embodiments, each set of sensor outputs (A, G, and optionally M) is transmitted with a sample index that increments from an initial value to a maximum value (e.g., from 0 to 255) then resets to the initial value, so that the receiver (e.g., the management device) can track and repair lost packets or samples. If one or more samples are lost, the sample points are interpolated based on the samples before and after the lost ones such as the following:

$$S(\text{lost}) = \text{Interpolate}(S(\text{lost}-1), S(\text{lost}+1), 0.5) \quad (10)$$

The above example interpolation function is a linear interpolation function. Different interpolation techniques can be used in other embodiments.

In some embodiments, the management device is installed with different applications for different types of exercises. The user may select an appropriate application for the specific exercise he is doing. The application determines, based on sensor measurements and using a process such as 500 described above, corrected core measurements for velocity, orientation, etc. In some embodiments, the corrected core measurements are further processed to derive additional corrected core measurements (e.g., acceleration) and/or additional form measurements such as cadence, range of motion, landing impact, etc.

Figure 6:
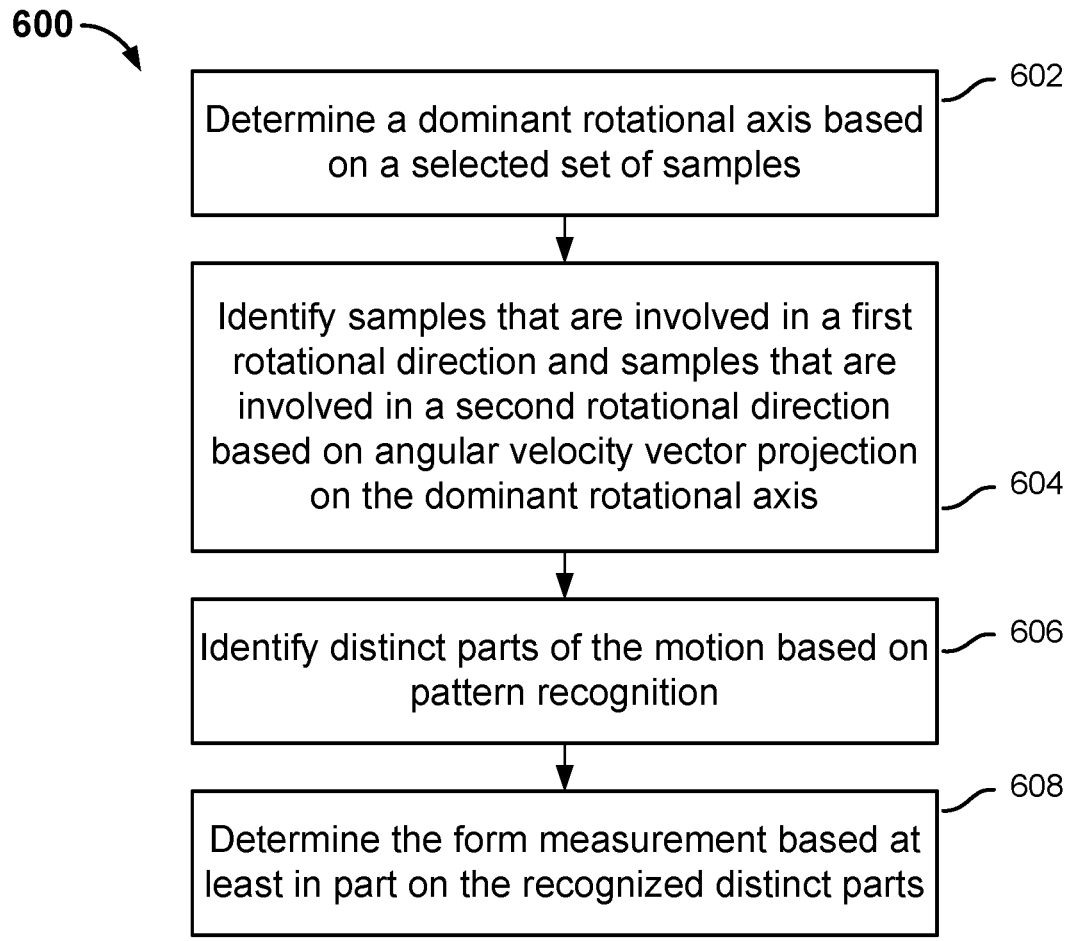
FIG. 6 is a flowchart illustrating an embodiment of a process for determining a form measurement associated with a single repetition of an exercise motion.

FIG. 6 is a flowchart illustrating an embodiment of a process for determining a form measurement associated with a single repetition of an exercise motion. Process 600 can be performed on an evaluation module such as 204 of FIG. 2A.

At 602, a selected sequence of samples (e.g., a set of corrected core measurements output by the estimator) is used to determine a dominant rotational axis. In some embodiments, a singular vector decomposition (SVD) of the rotational vectors Rw associated with the sequence of samples is performed to determine the dominant rotational axis.

At 604, the angular velocity vectors of the samples are projected on the dominant rotational axis to identify samples that are involved in a first rotational direction and samples that are involved in a second, different rotational direction relative to the dominant rotational axis. Specifically, for each sample point, a dot product of the rotational vector and the dominant rotational axis is computed.

At 606, distinct parts of the motion are identified based on pattern recognition, using the results of step 604. For example, the forward swing and the backward swing of the leg motion during running or the arm during swimming can be identified.

At 608, one or more form measurements such as cadence, range of motion, landing impact, etc., associated with a single repetition of a set of exercise motions taken by the user is determined based at least in part on the recognized distinct parts. Details of the determination are explained below in connection with FIGS. 7A and 7B.

Figure 7A:
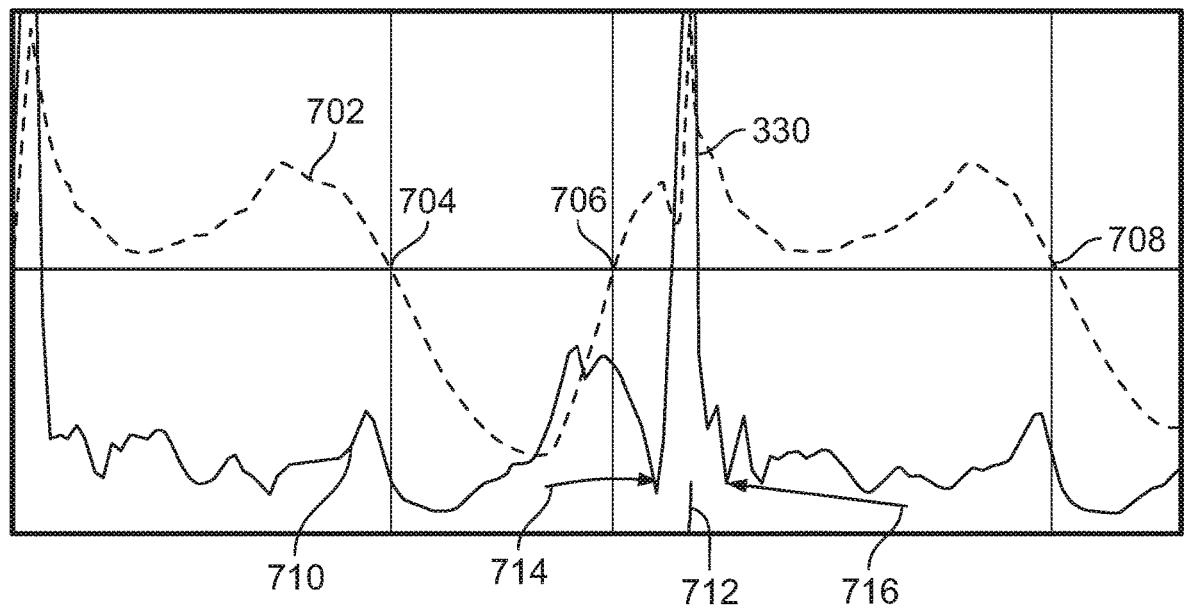
FIG. 7A is a sample data diagram illustrating the data processing of FIG. 6.

FIG. 7A is a sample data diagram illustrating the data processing of FIG. 6. In FIG. 7A, x-axis corresponds to time. Signal 702 corresponds to a projection of the angular velocity vectors on the dominant rotational axis according to 604 of process 600. Portions above the x-axis (e.g., the portion of signal 702 between markers 706 and 708) are involved in rotational motion in one direction, and portions below the x-axis (e.g., the portion of signal 702 between markers 704 and 706) are involved in rotational motions in the opposite direction.

A single repetition of an exercise can have multiple portions corresponding to different patterns. For example, based on pattern recognition (606 of process 600), the portion of signal 702 between markers 704 and 706, which matches a backward swing pattern of a single peak, is deemed to correspond to a backward swing of the leg; the portion of signal 702 between markers 706 and 708, which matches a forward swing pattern of multiple peaks, is deemed to correspond to a forward swing of the leg. Any appropriate pattern recognition technique can be used. Different exercises may have different patterns that are empirically determined.

In some embodiments, the form measurements derived based on the estimator's outputs include the forward time, the backward time, and a landing time. In FIG. 7A, line 710 corresponds to acceleration data. The landing time is determined by recognizing a landing pattern in the acceleration data, specifically a spike 330 in the acceleration. During the landing process the acceleration undergoes the greatest change. The point of impact, 712, is identified as the time spike 300 reaches its peak, and the landing time is identified as the time between 714 and 716. The landing impact is computed as the acceleration at the point of impact.

In some embodiments, the form measurement derived based on the estimator's outputs includes a cadence measurement. Specifically, the total time between 704 and 708 corresponds to the time for a single step, and the inverse of this value corresponds to the instantaneous cadence of the step.

In some embodiments, the form measurement includes a range of motion measurement. In this case, the range of motion is computed as the difference between the orientation measurement (Qw) at time 708 and time 704. This measurement can also be used to evaluate the stride length or stride angle of the user.

Figure 7B:
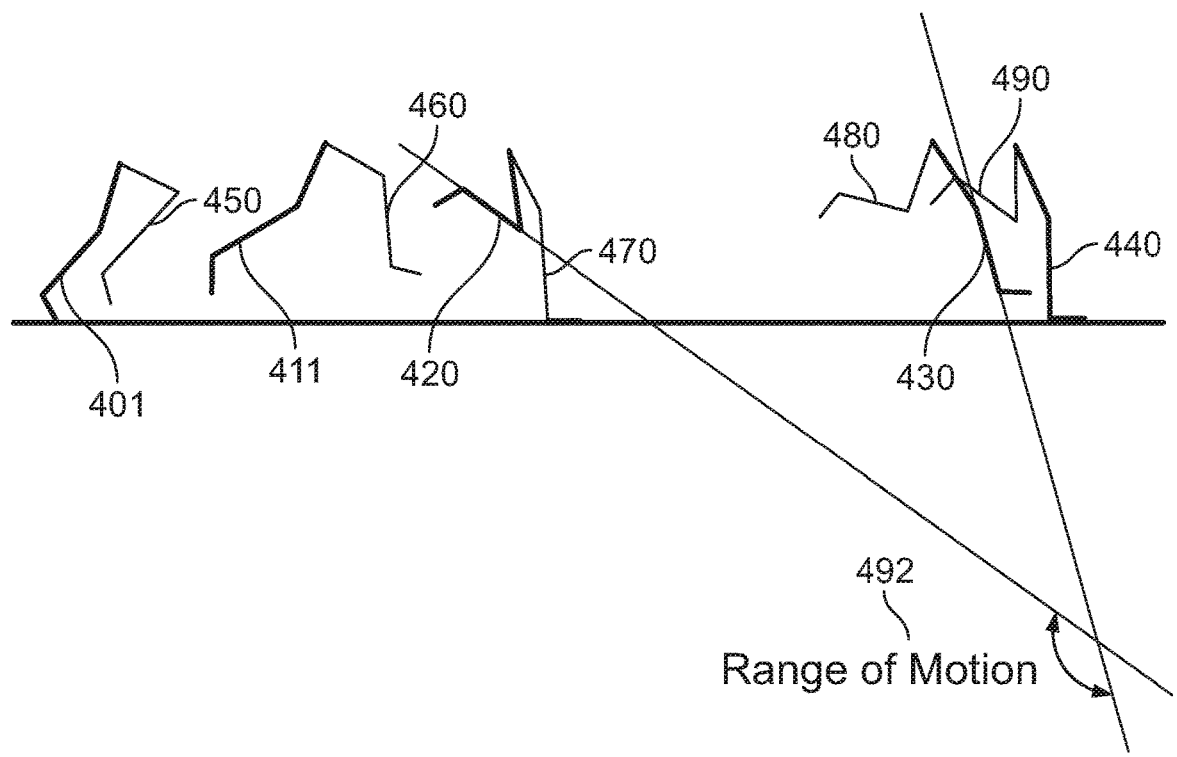
FIG. 7B is a diagram illustrating a simulation of a user's leg motion during a running exercise.

FIG. 7B is a diagram illustrating a simulation of a user's leg motion during a running exercise. A sensor device is attached to the leg illustrated using dark lines 401-440. The leg motion at 420 corresponds to time 704 of FIG. 7A, and the leg motion at 430 corresponds to time 708 of FIG. 7A.

In some embodiments, the form measurement includes an efficiency measurement. Specifically, an eigenfunction is applied to the angular velocity in world space to obtain an eigenvalue. The energy concentration of the resulting eigenvector indicates the energy concentration and efficiency of the motion. In some embodiments, the most dominant component of the eigenvector is compared with the other components to determine their difference. The greater the difference, the higher the efficiency. For example, the efficiency corresponding to an eigenvalue of (5, 1, 1) is higher than the efficiency corresponding to the eigenvalue of (5, 3, 1).

In some embodiments, the user wears multiple sensor devices, and the data collected from these devices are processed and compared. For example, a runner may wear a sensor device on each leg. Measurements from the devices are compared to determine the performance of each leg. In some embodiments, for each leg, the time, the range of motion, the efficiency, the average speed (measured as the range of motion/time), and/or the maximum speed during the forward swing phase, the backward swing phase, and the landing phase are computed. The measurements are compared to determine which side is stronger and/or more efficient.

Figures 9A, 9B:
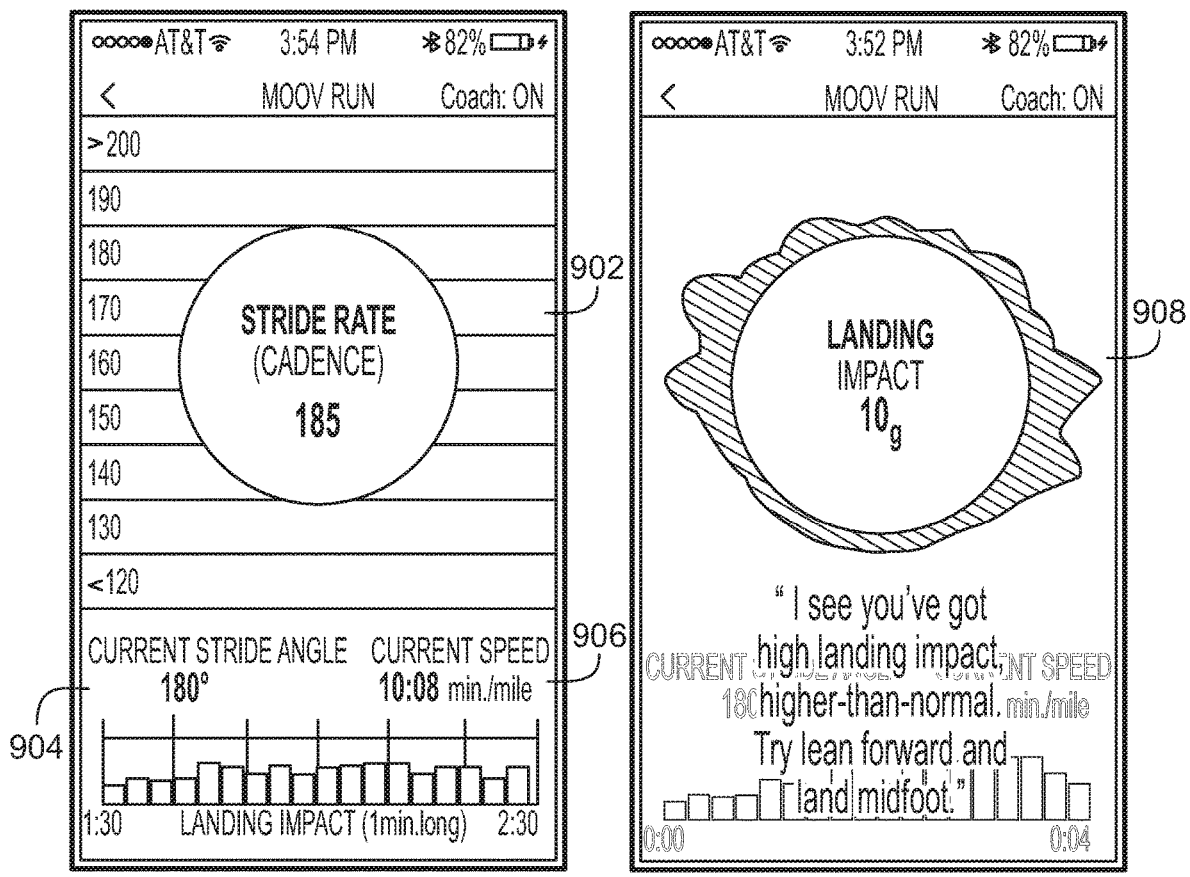
FIGS. 9A-9B are example user interface screens of showing feedback.

In some embodiments, the form measurements are displayed to the user as feedback. FIGS. 9A-9B are example user interface screens of showing feedback. In this example, an application on the management device displays the current stride rate (cadence) as the user is exercising in area 902, the current rotational angle in area 904, and the current speed in area 906. The landing impact values are computed at 3-second intervals, and are displayed in area 908. In this case, the landing impact value (which corresponds to a corrected acceleration measurement) exceeds a threshold. In response, the automated fitness coach displays a message indicating that the landing impact is higher than normal and offers suggestions for reducing landing impact.

In some embodiments, the form measurement of the user is compared with a target, and feedback is provided based on the comparison result. For example, the form measurements of a coached workout are preprogrammed and compared with the user's form data, and the user is informed of the comparison result via audio, video, graphics, tactile feedback, etc. In some embodiments, the coached workout is preprogrammed based on a coach performing the workout and includes form measurements of the coach's motions while performing the workout. For example, a boxing coach wears a sensor device on each arm while performing a sequence of boxing moves. Audio and/or video information of the workout is captured using standard recording equipment, and the form measurements of the workout are determined using the technique described above and recorded using a management device. The data is synchronized so that they can be played back together.

When a user (also wearing a sensor device on each wrist) is ready to perform the workout, he activates a coaching application on the management device. A video of the recorded workout is played on the management device for the user to follow along. Meanwhile, the user's motions are captured, and his corrected core measurements and/or form measurements are computed and compared to those of the recorded workout by the coach. The user can be given feedback based on the comparison results. For example, if the velocity of the user's motion is less than that of the coach by some threshold, the user will be informed that "you need to punch faster"; if the rotation of the user's motion is less than that of the coach by some other threshold, the user will be informed that "you need to rotate your arm more"; if the form measurements of the user closely resemble the recorded form measurements by the coach, he will receive encouraging comments such as "good job, keep it up." Any other audio/visual/sensory queues can be provided as feedback. In various embodiments, the feedback messages are determined based on a mapping of comparison results to feedback information, a rule-based lookup, or the like.

Figure 8:
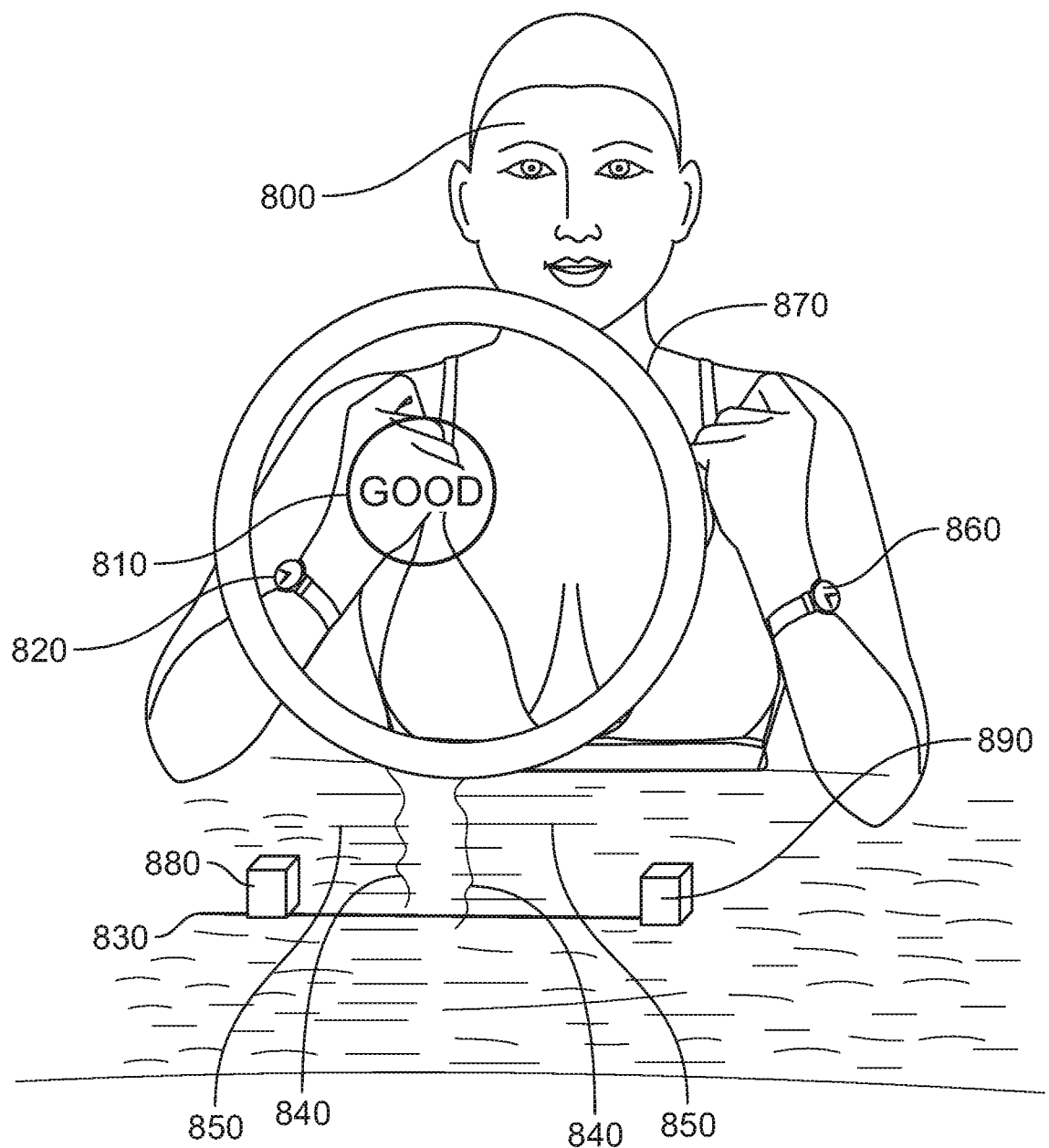
FIG. 8 is an example user interface screen displaying a screenshot of a coached boxing workout.

FIG. 8 is an example user interface screen displaying a screenshot of a coached boxing workout. The video of coach 800 performing the workout is displayed. During the workout, the coach wears sensor devices 820 and 860 on her wrists. The form measurements of motions by the coach's left and right arms are visualized using two sets of lines 850. The lines advance as the exercise progresses. Boxes 830 are used to indicate the present time. In this example, the lines continue to move up until they are outside the designated area and no longer visible. In this case, for the ease of visualization, a set of corrected core measurements and/or form measurement vectors are converted into a scalar value such that a longer line represents a faster and wider motion. In some embodiments, the magnitudes of the vectors are summed to generate the scalar value. Other types of representations can be used. As the user follows along the workout, his real-time data is processed. The form measurements of the user's movements can be translated into line lengths in the same way as the form measurements of the coach's movements as lines 840 which are overlaid on the set of lines 850. The left/right hand movement and attitude are represented by the visual object 880 and 890. Moreover, the speed of the user's motion is also represented by circle 870 in such a way that the greater the speed, the greater the size of the circle. An evaluation of the user's performance is displayed in a status area 810. In some embodiments, the evaluation is based on an aggregate value of the differences between the user's form measurements and the coach's form measurements.

Figure 10A:
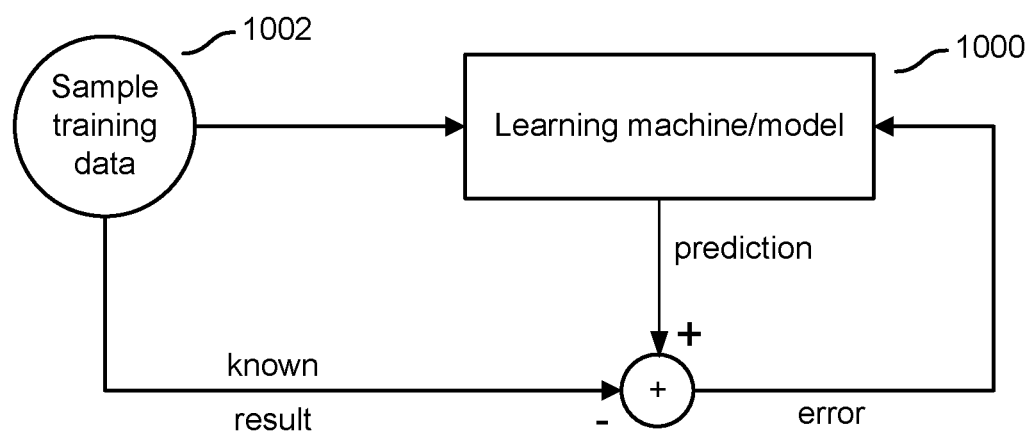
FIGS. 10A-10B are block diagrams illustrating a learning machine.
Figure 10B:
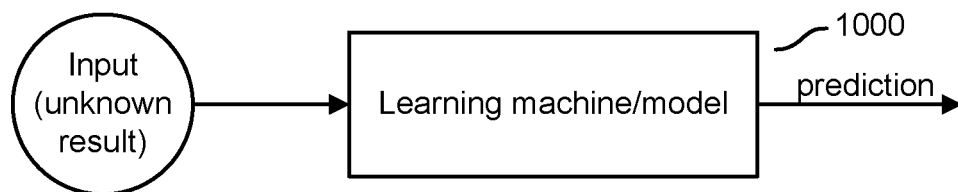

In some embodiments, a feedback model is constructed using a machine learning technique. FIGS. 10A-10B are block diagrams illustrating a learning machine. In FIG. 10A, a set of sample training data 1002 is input into a learning machine 1000 during a training process. Each piece of training data has a known set of inputs and a known result (also referred to as an output) associated with the known set of inputs. In some embodiments, the sample training data comprises core and/or form measurements of various users, and the outputs are the known results of their workouts (e.g., injury rate, fatigue level, recovery time, performance improvement based on a previous training session, etc.). Other training data can be used. The learning machine can be implemented using a decision tree, a neural network, a Bayesian classifier, a support vector machine (SVM), or any other appropriate machine learning methods. The learning technique analyzes the training data and generates an inferred function that models the input-output (result) relationship for the training data. Open source libraries and tools exist for implementing such learning techniques. In other words, a model (the function inferred from the training data) is used to make a prediction of the output result given an input. In some cases, the predicted outputs generated by the model are compared with the actual outputs of the samples to determine the prediction errors. The prediction errors are fed back to the model to adapt the model. For example, the coefficients or parameters of the model may be adjusted. The training data (or a portion of the training data) is input to the adapted model, and errors of the model are measured again. Adaptation changes to the model that improve the prediction (e.g., resulting in a smaller error rate or magnitude) are accepted. The adaptation process may repeat until an acceptable prediction error rate is reached. After training, in FIG. 10B, a new input with no known output is sent to learned model 1000, which will generate a predicted output.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A motion data processing system, comprising:
a communication interface to receive a plurality of motion data samples, wherein the plurality of motion data samples comprises a plurality of acceleration data samples obtained by an accelerometer and a plurality of angular velocity data samples obtained by a gyroscope, and the plurality of motion data samples pertains to a plurality of motions performed by a user;

an evaluation module coupled to the communication interface, to correct for distortions in the motion data samples, including to determine, based at least in part on some of the motion data samples, a set of one or more corrected core measurements of the user's body positions during a subset of the plurality of motions, and compare the plurality of motions performed by the user to a set of reference motions, wherein to determine the set of one or more corrected core measurements of the user's body positions during the subset of the plurality of motions includes to:
generate corrected orientation data based at least in part on some of the plurality of acceleration data samples and some of the plurality of angular velocity data samples, wherein to generate the corrected orientation data includes to:
determine a current orientation data sample based at least in part on at least some of the angular velocity data samples;
determine a corrected current orientation data sample based at least in part on at least some of the acceleration data samples; and
determine an interpolated and corrected orientation data sample by interpolating the current orientation data sample and the corrected current orientation data sample; and
generate corrected velocity data based at least in part on the corrected orientation data and a statistical model; and
a user interface to provide feedback to the user, the feedback being based at least in part on a result of the comparing the plurality of motions performed by the user to the set of reference motions.

2. The system of claim 1, wherein the plurality of motion data samples further comprises a plurality of magnetic field data samples.

3. The system of claim 1, wherein the set of one or more corrected core measurements is determined based at least in part on a statistical model.

4. The system of claim 1, wherein to determine the current orientation data sample includes performing a quaternion transform of a previous interpolated and corrected orientation data sample and a current angular velocity data sample.

5. The system of claim 1, wherein the statistical model is a distribution model of sensor output features to ground truth motion velocity.

6. The system of claim 1, wherein to generate the corrected velocity data includes to:
determine an acceleration in world space;
integrate the acceleration to determine a current velocity data sample;
determine a probability distribution of a ground truth velocity based at least in part on the statistical model;
determine an offset velocity to maximize a sum of probabilities for a sample window; and
determine a corrected current output velocity based at least in part on the probability distribution and the offset velocity.

7. The system of claim 1, wherein the plurality of acceleration data samples and the plurality of angular velocity data samples are preprocessed, the preprocessing including to detect a lost data sample and to estimate the lost data sample by interpolation of received data samples.

8. The system of claim 1, wherein the evaluation module is further to determine a form measurement that characterizes the user's form during the subset of the plurality of motions.

9. The system of claim 8, wherein the form measurement is determined based at least in part on pattern recognition.

10. The system of claim 8, wherein to determine the form measurement includes to:
determine a dominant rotational axis based at least in part on the set of the corrected core measurements; and
identify a first set of samples involved in a first rotational direction and a second set of samples that are involved in a second rotational direction based on a projection on the dominant rotational axis.

11. The system of claim 8, wherein to determine the form measurement further includes to identify distinct parts of the set of corrected core measurements based on pattern recognition; and
determine the form measurement based on the identified distinct parts.

12. The system of claim 1, wherein the set of one or more corrected core measurements includes a quaternion vector associated with the subset of the motions and a velocity vector associated with the subset of the motions.

13. A method comprising:
receiving a plurality of motion data samples, wherein the plurality of motion data samples comprises a plurality of acceleration data samples obtained by an accelerometer and a plurality of angular velocity data samples obtained by a gyroscope, and the plurality of motion data samples pertains to a plurality of motions performed by a user;
correcting for distortions in the motion data samples, including determining, based at least in part on some of the motion data samples, a set of one or more corrected core measurements of the user's body positions during a subset of the plurality of motions, the determining the set of one or more corrected core measurements of the user's body positions during the subset of the plurality of motions including:
generating corrected orientation data based at least in part on some of the plurality of acceleration data samples and some of the plurality of angular velocity data samples, wherein the generating the corrected orientation data includes:
determining a current orientation data sample based at least in part on at least some of the angular velocity data samples;
determining a corrected current orientation data sample based at least in part on at least some of the acceleration data samples; and
determining an interpolated and corrected orientation data sample by interpolating the current orientation data sample and the corrected current orientation data sample; and
generating corrected velocity data based at least in part on the corrected orientation data and a statistical model;
comparing the plurality of motions performed by the user to a set of reference motions; and
providing feedback to the user, the feedback being based at least in part on a result of the comparing the plurality of motions performed by the user to the set of reference motions.

14. The method of claim 13, further comprising determining a form measurement that characterizes the user's form during the subset of the plurality of motions.

15. The method of claim 13, wherein the set of one or more corrected core measurements is determined based at least in part on a statistical model.

16. A computer program product for motion data processing, the computer program product being embodied in a tangible computer readable storage medium and comprising computer instructions for:
- receiving a plurality of motion data samples, wherein the plurality of motion data samples comprises a plurality of acceleration data samples obtained by an accelerometer and a plurality of angular velocity data samples obtained by a gyroscope, and the plurality of motion data samples pertains to a plurality of motions performed by a user;
- correcting for distortions in the motion data samples, including determining, based at least in part on some of the motion data samples, a set of one or more corrected core measurements of the user's body positions during a subset of the plurality of motions, the determining the set of one or more corrected core measurements of the user's body positions during the subset of the plurality of motions including:
  - generating corrected orientation data based at least in part on some of the plurality of acceleration data samples and some of the plurality of angular velocity data samples, wherein the generating the corrected orientation data includes:
    - determining a current orientation data sample based at least in part on at least some of the angular velocity data samples;
    - determining a corrected current orientation data sample based at least in part on at least some of the acceleration data samples; and
    - determining an interpolated and corrected orientation data sample by interpolating the current orientation data sample and the corrected current orientation data sample; and
  - generating corrected velocity data based at least in part on the corrected orientation data and a statistical model;
- comparing the plurality of motions performed by the user to a set of reference motions; and
- providing feedback to the user, the feedback being based at least in part on a result of the comparing the plurality of motions performed by the user to the set of reference motions.

17. An automated fitness coaching system, comprising:
a motion sensor comprising:
- an accelerometer to take acceleration measurements pertaining to a plurality of motions performed by a user and outputs a plurality of acceleration data samples; and
- a gyroscope to take angular velocity measurements pertaining to the plurality of motions performed by the user and outputs a plurality of angular velocity data samples;
a communication interface coupled to the motion sensor and to transfer at least the plurality of acceleration data samples and the plurality of angular velocity data samples to a processor to determine a set of one or more corrected core measurements of the user's body positions during a subset of the plurality of motions, wherein to determine the set of one or more corrected core measurements of the user's body positions during the subset of the plurality of motions includes to:
- generate corrected orientation data based at least in part on some of the plurality of acceleration data samples and some of the plurality of angular velocity data samples, wherein to generate the corrected orientation data includes to:
  - determine a current orientation data sample based at least in part on at least some of the angular velocity data samples;
  - determine a corrected current orientation data sample based at least in part on at least some of the acceleration data samples; and
  - determine an interpolated and corrected orientation data sample by interpolating the current orientation data sample and the corrected current orientation data sample; and
- generate corrected velocity data based at least in part on the corrected orientation data and a statistical model; and
a user interface to provide feedback to the user, the feedback being based at least in part on a result of a comparison the plurality of motions performed by the user to the set of reference motions.

18. The method of claim 13, wherein the feedback comprises a recommendation for the user to adjust a form of an exercise.

19. The method of claim 13, wherein the feedback comprises a difference between the plurality of motions performed by a user and the set of reference motions.

20. The system of claim 1, wherein to determine the set of one or more corrected core measurements of the user's body positions during the subset of the plurality of motions includes to performing a transformation of one or more vectors representing at least part of the motion data samples from a local space in which the motion data samples are measured to a world space.

* * * * *